United States Patent
Bange et al.

(10) Patent No.: US 6,519,975 B1
(45) Date of Patent: Feb. 18, 2003

(54) METHOD OF MAKING FLUORINATED RARE EARTH DOPED GLASS AND GLASS-CERAMIC WAVEGUIDES

(75) Inventors: James Crawford Bange, Corning, NY (US); Nicholas Francis Borrelli, Elmira, NY (US); Lauren Kay Cornelius, Painted Post, NY (US); John White O'Connell, Corning, NY (US); Paul Arthur Tick, Corning, NY (US)

(73) Assignee: Corning Incorporated, Corning, NY (US)

( * ) Notice: Subject to any disclaimer, the term of this patent is extended or adjusted under 35 U.S.C. 154(b) by 99 days.

(21) Appl. No.: 09/643,574

(22) Filed: Aug. 22, 2000

Related U.S. Application Data

(62) Division of application No. 09/081,856, filed on May 19, 1998, now Pat. No. 6,205,281.
(60) Provisional application No. 60/047,711, filed on May 27, 1997.

(51) Int. Cl.[7] ............................................. C03B 37/023
(52) U.S. Cl. ............................. 65/384; 65/397; 65/390; 65/405; 65/33.3; 65/33.7
(58) Field of Search .................. 65/384, 397, 390, 65/405, 33.3, 33.7

(56) References Cited

U.S. PATENT DOCUMENTS

| | | |
|---|---|---|
| 5,420,080 A | 5/1995 | Wang et al. |
| 5,483,628 A | 1/1996 | Borrelli et al. |
| 5,537,505 A | 7/1996 | Borrelli et al. |
| 5,545,595 A | 8/1996 | Wang et al. |
| 5,772,915 A | 6/1998 | Jha et al. ........................ 501/40 |
| 5,774,620 A | 6/1998 | Nishida et al. ............. 385/141 |
| 5,858,891 A | 1/1999 | Auzel et al. .................... 501/40 |
| 5,936,762 A | 8/1999 | Samson et al. ............. 359/341 |
| 5,955,388 A | 9/1999 | Dejneka ........................ 501/3 |

*Primary Examiner*—John Hoffmann
(74) *Attorney, Agent, or Firm*—James V. Suggs

(57) ABSTRACT

The present invention is directed to a fluorinated rare earth doped glass composition and method for making a glass-ceramic optical article therefrom, e.g. optical fiber waveguides, fiber lasers and active fiber amplifiers, having application in the 1300 nm and 1550 nm telecommunications windows. The inventive compositions include $Pr^{3+}$ and/or $Dy^{3+}$ in a concentration range of between 300–2,000 ppmw and $Ag^+$ in a concentration range of between 500–2000 ppmw; or $Er^{3+}$ in a concentration range of between 500–5,000 ppmw and $Ag^+$ in a concentration range of between 0–2,000 ppmw. The monovalent silver ion provides an ionic charge balanced glass-ceramic crystal. These compositions exhibit reduced or absent rare earth ion clustering and fluorescence quenching effects in the presence of high concentrations of rare earth ion dopants.

16 Claims, 6 Drawing Sheets

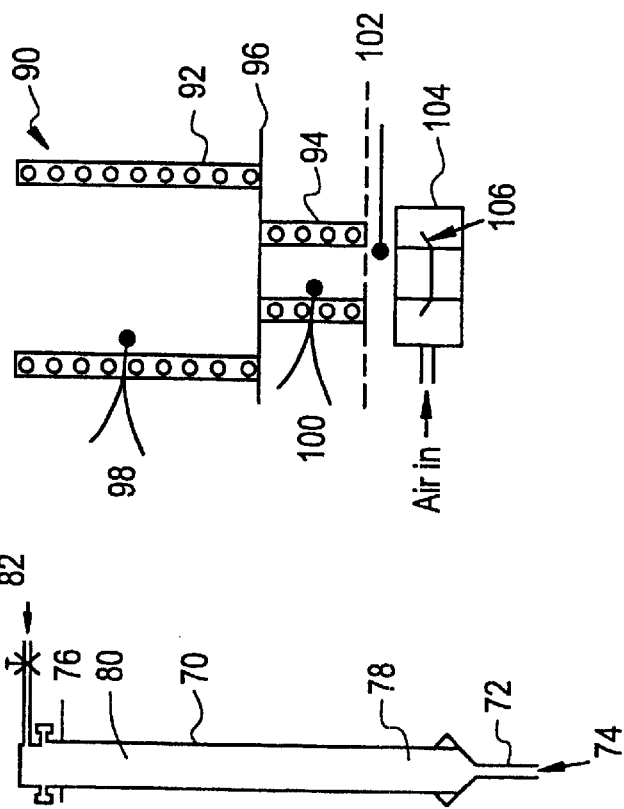
FIG. 6D
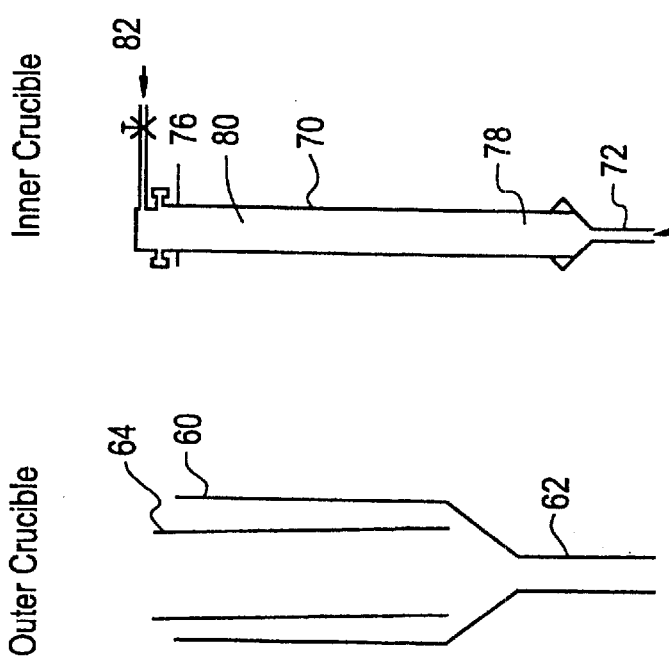
FIG. 6C Inner Crucible
FIG. 6B Outer Crucible
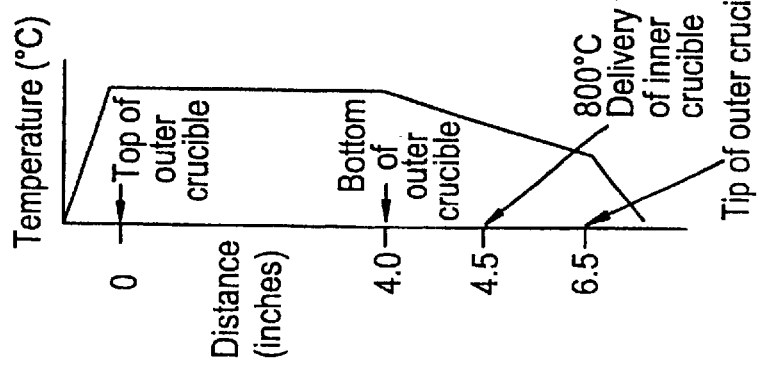
FIG. 6A

METHOD OF MAKING FLUORINATED RARE EARTH DOPED GLASS AND GLASS-CERAMIC WAVEGUIDES

This application is a divisional under 35 U.S.C. §120 of U.S. patent application Ser. No. 09/081,856, filed May 19, 1998, now U.S. Pat. No. 6,205,281, which claims the benefit under 35 U.S.C. §119(e) of U.S. Provisional Patent Application Serial No. 60/047,711, filed May 27, 1997.

This application is related to U.S. Pat. Nos. 5,483,628 and 5,537,505 (hereinafter, the '628 and the '505 patents, respectively), both of which are herein incorporated by reference in their entirety.

FIELD OF THE INVENTION

The invention relates to a fluorinated, rare earth doped glass composition that exhibits reduced rare earth ion clustering and fluorescence quenching in the presence of relatively high concentrations of rare earth dopants, and to ultratransparent glass-ceramic articles, particularly active fiber waveguides and devices, e.g., fiber amplifiers and lasers, that utilize such waveguides. As used herein, the term "ultratransparent" refers to high optical clarity; i.e., the transparency of the glass-ceramic of the invention compares to the transparency of glass over the spectrum from about 350 nm to 2.5$\mu$.

BACKGROUND OF THE INVENTION

There is widespread interest in, and industrial need for, optical compositions and articles made therefrom having potential applications in the 1300 nm and 1550 nm telecommunications windows. Promising candidates for an efficient 1300 nm fiber optical amplifier material, for example, have included the rare earth ions $Pr^{3+}$ and $Dy^{3+}$ doped in fluoride, mixed halide, and sulfide glass hosts, while 1550 nm amplifier materials are suitably doped with $Er^{3+}$. A recent publication by Borrelli et al., Transparent glass ceramics for 1300 nm amplifier applications, J. Appl. Phys. 78 (11), (Sept. 1995), reported an alternative host for the $Pr^{3+}$ ion which combines some of the advantages of both fluoride and oxide glasses. The new material is described in the '505 patent and consists of an oxyfluoride glass which has been appropriately heat treated to form a transparent glass-ceramic. This glass-ceramic contained 5–40 volume % fluoride nanocrystals having diameters ranging between about 6–15 nm, embedded in a primarily oxide glass matrix. As described in detail in the '1505 patent, optically active fluoride based glass-ceramic articles were produced from Yb-free compositions that included between about 50 to 900 ppmw $Pr^{3+}$. The glass-ceramic was shown to perform as an active device in the 1300 nm spectral window over this dopant concentration range. For the $Pr^{3+}$ doped glass-ceramics, fluorescence lifetimes greater than 120 microseconds were observed in the base glasses of the '505 patent at $Pr^{3+}$ concentrations up to about 500 ppmw. Concentration quenching was observed at $Pr^{3+}$ concentrations slightly above 500 ppmw, and fluorescence lifetimes were observed to decrease approximately linearly to about 70 microseconds at 900 ppmw. It was reported that a best case balance between fluorescence lifetime and concentration was achieved with $Pr^{3+}$ in the range of about 200 to 550 ppmw; however, functional active devices were reported with $Pr^{3+}$ concentrations in the range of about 50 to 650 ppmw. Since both longer fluorescence lifetimes and higher dopant concentrations are desirable for the production of active devices as described herein, the inventors recognized a need to improve upon the compositional ranges of the new glass-ceramic material described in the '505 patent, and to devise glass-ceramic compositions having similar advantages suitable for 1550 nm applications.

The radiative quantum efficiency is a key parameter in evaluating transparent glass-ceramics as a potential gain medium for fiber lasers and amplifiers. Quimby and Tick, in an article entitled Quantum efficiency of $Pr^{3+}$ doped transparent glass-ceramics (to be published) report on the quantum efficiency of the 1300 nm emission in $Pr^{3+}$ doped transparent glass-ceramics using a direct measurement technique based upon relative fluorescence measurements. Fluorescence was observed by exciting the $Pr^{3+}$ $^1D_2$ level, peaking at around 1460 nm (the "A" transition), and the fluorescence from the $^1G_4$ level, peaking at about 1300 nm (the "B" transition), when the $^1D_2$ level was directly excited with 595 nm dye laser radiation. Following the analysis described by Quimby et al., Opt. Left., 20, 2021 (1995), the quantum efficiency of the $^1G_4$ 1300 nm emission was determined by taking the ratio of the total B transition rate to the total A transition rate. The data in FIG. 1, to be described in more detail below, shows the measured B/A ratio for exemplary embodiments of the two base composition glass-ceramics of the '505 patent having $Pr^{3+}$ concentrations ranging from about 25 ppmw to 1000 ppmw. As expected by the inventors, the B/A ratio increases with increasing concentration which they believe to be due to the effect of cross-relaxation resulting from increased $Pr^{3+}$ ion clustering.

It is known that when a trivalent rare earth, e.g., $Pr^{3+}$, is incorporated into these glass-ceramics, the rare earth is segregated into the second phase crystals which are formed during the ceraming process. These crystals have a cubic lattice structure and are thought to be comprised of mostly divalent cadmium- and lead-fluoride. The inventors believe that clustering arises from local strains that are established within the lattice because of the substitution of trivalent rare earth fluorides for the divalent fluorides. When direct substitution of a rare earth into the crystal lattice occurs, charge balance can be maintained by incorporating an interstitial fluorine into the crystal structure near the rare earth. In bulk crystals this is the source of the local strain, which is observed to decrease when these defects can cluster. The inventors believe that a similar mechanism occurs in the nanocrystals of the glass-ceramic. This, however, results in a decrease in the quantum efficiency at higher concentrations of Pr, observed by the authors to appear at concentrations of about 500 ppmw.

The inventors have therefore recognized a need for transparent rare earth doped glass and glass-ceramic compositions and articles made therefrom in which rare earth ion clustering and concentration quenching are reduced notwithstanding high rare earth dopant concentrations, which have a relatively high quantum efficiency, and a wider spectral gain band.

SUMMARY OF THE INVENTION

Accordingly, the invention is directed to a glass-ceramic optical article having a glass composition providing such features, and to a method for making glass-ceramic optical fiber waveguide articles having core and cladding compositions as described herein.

An embodiment of the invention is directed to a glass-ceramic optical article. The compositional structure of the glass-ceramic article is a second phase cubic lattice substantially including either divalent cadmium fluoride or divalent lead fluoride having a trivalent rare earth ion incorporated therein, and including a monovalent silver or monovalent thallium ion to charge balance the crystal.

Another embodiment of the present invention that is particularly suitable for applications in the 1300 nm telecommunications window describes a glass-ceramic optical article including an active core that is a transparent glass-ceramic having substantially only one crystal phase, consisting essentially, in terms of cation percent, of: $SiO_2$ 20–40; $AlO_{1.5}$ 10–20; $CdF_2$ 19–34; $PbF_2$ 19–23; wherein up to 5 mole % of CdS or 3 mole % of $CdCl_2$ can be substituted for an equivalent amount of $CdF_2$, or an equivalent amount of an oxide can be substituted for the fluoride; and including at least one of the rare earth fluorides $YF_3$ (3–7), $GdF_3$ (3–7), and $LuF_3$ (4–15) wherein the total amount of these rare earth fluorides is (3–15); including at least one of $Pr^{3+}$ and $Dy^{3+}$ at a concentration in the range of about 300 to 2,000 ppmw; and including $Ag^+$ at a concentration in the range of about 500 to 2,000 ppmw; and a cladding that is a transparent glass, consisting essentially, in weight percent on an oxide basis, of: $SiO_2$ 25–35; $Al_2O_3$ 3–5; $CdF_2$ 12–16; $PbF_2$ 40–50; $ZnF_2$ 4–8; and $Bi_2O_3$ 0–10.

Another embodiment of the present invention that is particularly suitable for applications in the 1300 nm telecommunications window describes a glass-ceramic optical article including an active core that is a transparent glass-ceramic, having substantially only one crystal phase, consisting essentially, in terms of cation percent, of: $SiO_2$ 20–40; $PbF_2$ 15–25; $AlO_{1.5}$ 10–20; $CdF_2$ 21–31; $ZnF_2$ 3–7; wherein up to 5 mole % of CdS or 3 mole % of $CdCl_2$ can be substituted for an equivalent amount of $CdF_2$, or an equivalent amount of an oxide can be substituted for the fluoride; and including at least one of the rare earth fluorides $YF_3$ (3–7), $GdF_3$ (3–7), and $LuF_3$ (4–15) wherein the total amount of these rare earth fluorides is (3–15); including at least one of $Pr^{3+}$ and $Dy^{3+}$ at a concentration in the range of about 300 to 2,000 ppmw; and including $Ag^+$ at a concentration in the range of about 500 to 2,000 ppmw; and a cladding that is a transparent glass, consisting essentially, in weight percent on an oxide basis, of: $SiO_2$ 25–35; $Al_2O_3$ 3–5; $CdF_2$ 12–16; $PbF_2$ 40–50; $ZnF_2$ 4–8; and $Bi_2O_3$ 0–10.

In an aspect of the above described embodiments, the $Ag^+$ is at a concentration in the range of about 700 to 1,000 ppmw.

Another embodiment of the invention that is particularly suited for applications in the 1550 nm telecommunications window describes a glass-ceramic optical article including an active core that is a transparent glass-ceramic having substantially only one crystal phase, consisting essentially, in terms of cation percent, of: $SiO_2$ 20–40; $AlO_{1.5}$ 10–20; $CdF_2$ 19–34; $PbF_2$ 19–23; wherein up to 5 mole % of CdS or 3 mole % of $CdCl_2$ can be substituted for an equivalent amount of $CdF_2$, or an equivalent amount of an oxide can be substituted for the fluoride; and including at least one of the rare earth fluorides $YF_3$ (3–7), $GdF_3$ (3–7), and $LuF_3$ (4–15) wherein the total amount of these rare earth fluorides is (3–15); $ErF_3$ at a concentration in the range of about 500 to 5,000 ppmw; and including $Ag^+$ at a concentration in the range between zero to 2,000 ppmw; and a cladding that is a transparent glass, consisting essentially, in weight percent on an oxide basis, of: $SiO_2$ 25–35; $Al_2O_3$ 3–5; $CdF_2$ 12–16; $PbF_2$ 40–50; $ZnF_2$ 4–8; and $Bi_2O_3$ 0–10.

Another embodiment of the invention that is particularly suited for applications in the 1550 nm telecommunications window describes a glass-ceramic optical article including an active core that is a transparent glass-ceramic having substantially only one crystal phase, consisting essentially, in terms of cation percent, of: $SiO_2$ 20–40; $PbF_2$ 15–25; $AlO_{1.5}$ 10–20; $CdF_2$ 21–31; $ZnF_2$ 3–7; wherein up to 5 mole % of CdS or 3 mole % of $CdCl_2$ can be substituted for an equivalent amount of $CdF_2$, or an equivalent amount of an oxide can be substituted for the fluoride; and including at least one of the rare earth fluorides $YF_3$ (3–7), $GdF_3$ (3–7), and $LuF_3$ (4–15) wherein the total amount of these rare earth fluorides is (3–15); $ErF_3$ at a concentration in the range of about 500 to 5,000 ppmw; and including $Ag^+$ at a concentration in the range between zero to 2,000 ppmw; and a cladding that is a transparent glass, consisting essentially, in weight percent on an oxide basis, of: $SiO_2$ 25–35; $Al_2O_3$ 3–5; $CdF_2$ 12–16; $PbF_2$ 40–50; $ZnF_2$ 4–8; and $Bi_2O_3$ 0–10.

In an aspect of all of the above described embodiments, the core is an elongated central member having a first and a second end, and the cladding covers the surface of the elongated central member but leaves exposed the first and second ends.

In another aspect of all of the above described embodiments, the core composition contains up to 17 cation percent total of at least one component selected from the group consisting of (0–7%) $BO_{1.5}$, (0–12%) $GeO_2$, (0–7%) $PO_{2.5}$, (0–3%) $TiO_2$, (0–2%) $Nb_2O_5$, (0–7%) $GaF_3$, (0–7%) $HfF_4$, (0–7%) $InF_3$, (0–15%) $BiF_3$, (0–1%) $LaF_3$, (0–3%) $CdCl_2$, and (0–5%) CdS.

In an aspect of all of the embodiments recited above, silver is in the form of a monovalent cation provided by, e.g., silver fluoride (AgF), silver oxide ($Ag_2O$), silver nitrate ($AgNO_3$), or any common silver salt Another aspect of the invention pertains to a method for making an optical fiber waveguide comprising the steps of charging an inner crucible of a double crucible furnace with a finished core glass composition in a fluid state, preferably in the form of remelted cullet, providing a cladding glass having a sufficient stiffness to contain the fluid core, preferably in the form of a tube, in an outer crucible of the double crucible furnace, maintaining the core and cladding glasses at a temperature at or above their respective liquidus temperatures such that no portion of the core or cladding glasses above their respective liquidus temperatures comes into contact with a platinum wall of the double crucible; extracting an elongated glass article from the furnace, and cooling the glass article to below its liquidus temperature. In an aspect of the embodiment, the center member glass and the cladding glass are heated to a temperature in the range of about 800–1300° C., and the elongated glass article is quenched to a temperature below the peak crystallization temperature in a time of less than 1 minute.

The elongated glass article, e.g., an optical fiber, preferably has a first and a second end, and has a core and cladding composition described in one of the above recited embodiments. The core of the glass article can be transformed into a transparent glass-ceramic having high optical clarity and containing essentially only one crystal phase by heating the elongated glass article at a pre-selected temperature for a pre-selected time. Preferably, the ceramming step is carried out by heating the glass article to near the peak crystallization temperature of the central member glass for between about ½–24 hours. By the expression "substantially one crystal phase," it is meant that the glass-ceramic does not contain a sufficient amount of a second crystal phase to alter the chemical and/or physical characteristics of the glass-ceramic, most particularly, the optical clarity. Most preferably, no amount of a second crystal phase will be present. The rare earth metal ions are present in the crystal phase(s).

In an aspect of the invention in which the core glass composition contains up to 5 mole % of CdS or 3 mole % of $CdCl_2$ substituted for an equivalent amount of $CdF_2$, or has an equivalent amount of oxide substituted for fluoride, the glass core is transformed into a glass-ceramic upon cooling as the article leaves the furnace, and no additional or external ceramming step is required.

Additional features and advantages of the invention will be set forth in the description which follows, and in part will be apparent from the description, or may be learned by practice of the invention. The objectives and other advantages of the invention will be realized and attained by the apparatus and method particularly pointed out in the written description and claims hereof as well as the appended drawings.

It is to be understood that both the foregoing general description and the following detailed description are exemplary and are intended to provide further explanation of the invention as claimed.

The accompanying drawings are included to provide a further understanding of the invention and are incorporated in and constitutes a part of this specification; illustrates embodiments of the invention; and together with the description serve to explain the principles of the invention.

BRIEF DESCRIPTION OF THE DRAWINGS

FIG. 6(a) shows the relative temperatures of the glass at different locations in the double crucible furnace;

FIG. 6(b) schematically shows the outer crucible of a double crucible furnace according to an embodiment of the invention, including an inner crucible centering ring in the neck region thereof;

FIG. 6(c) schematically shows the inner crucible of a double crucible furnace according to an embodiment of the invention; and FIG. 6(d) schematically shows a two zone furnace with a cooling ring according to an embodiment of the invention.

DETAILED DESCRIPTION OF PREFERRED EMBODIMENTS OF THE INVENTION

Figure 1:
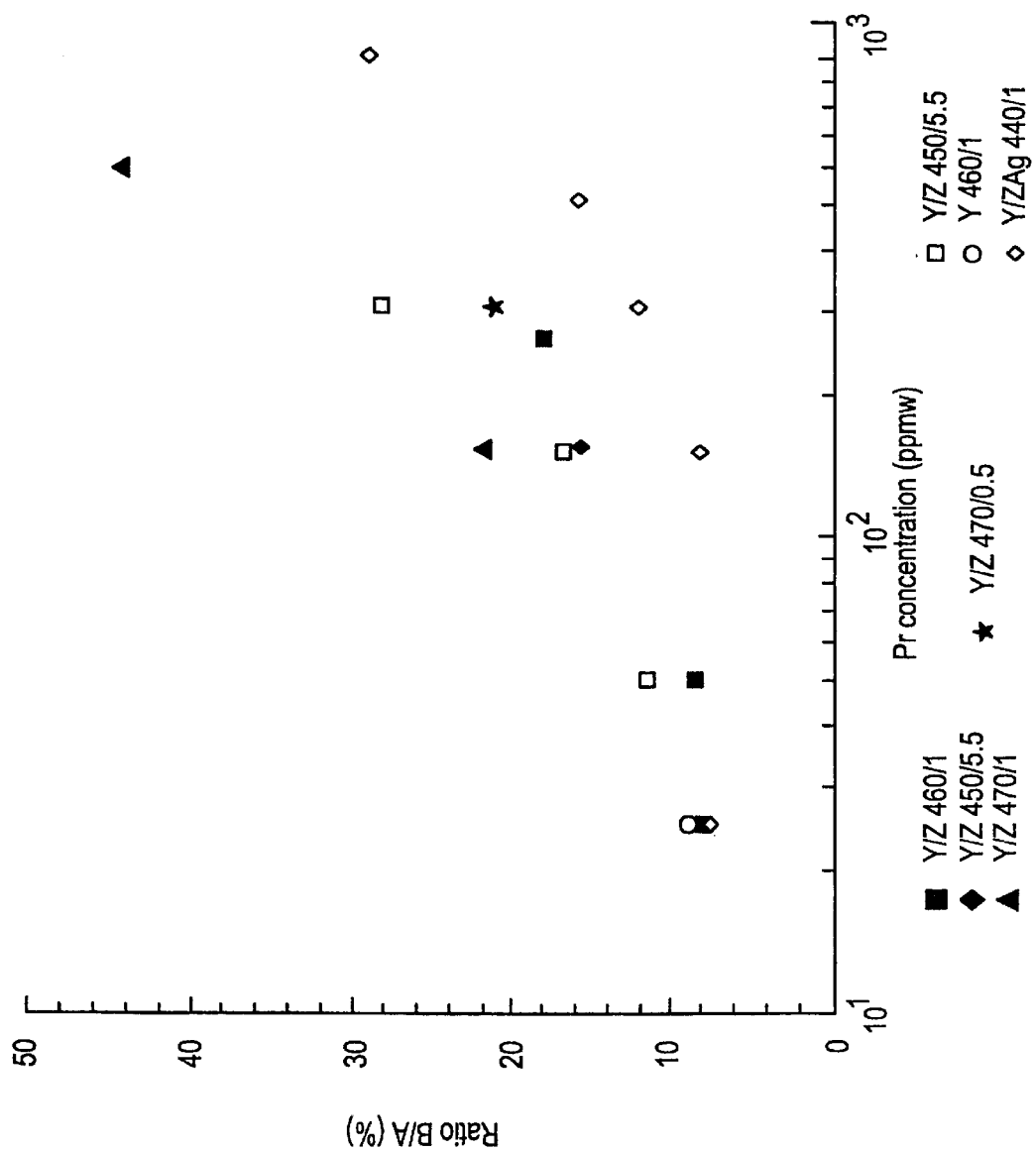
FIG. 1 is a graph showing the B/A ratio (measure of cross relaxation) as a function of $Pr^{3+}$ concentration in ppmw for several exemplary compositional embodiments of the invention with and without Ag, which indicates the reduced cross relaxation at higher $Pr^{3+}$ concentration for the composition containing Ag.

According to an embodiment of the invention, glass-ceramic optical articles such as single mode and multimode optical waveguide fibers and optically active devices utilizing these fibers, e.g., optical amplifiers and lasers, are suitably fabricated from the inventive glass core compositions listed in Tables I–IV, and the compatible covering or cladding glass composition listed in Table V below.

TABLE I

| (in cation % unless otherwise indicated) | |
|---|---|
| $SiO_2$ | 20–40; |
| $AlO_{1.5}$ | 10–20; |
| $CdF_2$ | 19–34; |
| $PbF_2$ | 19–23; | wherein up to 5 mole % of CdS or 3 mole % of $CdCl_2$ can be substituted for an equivalent amount of $CdF_2$, or an equivalent amount of an oxide can be substituted for the fluoride;
$YF_3$ (3–7) and/or $GdF_3$ (3–7) and/or $LuF_3$ (4–15) [total (3–15)];
$Pr^{3+}$ and/or $Dy^{3+}$ (300 to 2,000 ppmw); and
$Ag^+$ (500 to 2,000 ppmw);

TABLE II

| (in cation % unless otherwise indicated) | |
|---|---|
| $SiO_2$ | 20–40; |
| $PbF_2$ | 15–25; |
| $AlO_{1.5}$ | 10–20; |
| $CdF_2$ | 21–31; |
| $ZnF_2$ | 3–7; | wherein up to 5 mole % of CdS or 3 mole % of $CdCl_2$ can be substituted for an equivalent amount of $CdF_2$, or an equivalent amount of an oxide can be substituted for the fluoride;
$YF_3$ (3–7) and/or $GdF_3$ (3–7) and/or $LuF_3$ (4–15) [total (3–15)];
$Pr^{3+}$ and/or $Dy^{3+}$ (300 to 2,000 ppmw); and
$Ag^+$ (500 to 2,000 ppmw);

TABLE III

| (in cation % unless otherwise indicated) | |
|---|---|
| $SiO_2$ | 20–40; |
| $AlO_{1.5}$ | 10–20; |
| $CdF_2$ | 19–34; |
| $PbF_2$ | 19–23; | wherein up to 5 mole % of CdS or 3 mole % of $CdCl_2$ can be substituted for an equivalent amount of $CdF_2$, or an equivalent amount of an oxide can be substituted for the fluoride;
$YF_3$ (3–7) and/or $GdF_3$ (3–7) and/or $LUF_3$ (4–15), [total (3–15)];
$ErF_3$ (500–5,000 ppmw); and
$Ag^+$ (0–2,000 ppmw);

TABLE IV

| (in cation % unless otherwise indicated) | |
|---|---|
| $SiO_2$ | 20–40; |
| $PbF_2$ | 15–25; |
| $AlO_{1.5}$ | 10–20; |
| $CdF_2$ | 21–31; |
| $ZnF_2$ | 3–7; | wherein up to 5 mole % of CdS or 3 mole % of $CdCl_2$ can be substituted for an equivalent amount of $CdF_2$, or an equivalent amount of an oxide can be substituted for the fluoride, or 3–7 mole % ZnO substituted for $ZnF_2$;
$YF_3$ (3–7) and/or $GdF_3$ (3–7) and/or $LuF_3$ (4–15), [total (3–15)];
$ErF_3$ (500–5,000 ppmw); and
$Ag^+$ (0–2,000 ppmw);

TABLE V

| (in weight % on an oxide basis) | |
|---|---|
| $SiO_2$ | 25–35; |
| $Al_2O_3$ | 3–5; |
| $CdF_2$ | 12–16; |

TABLE V-continued (in weight % on an oxide basis)

| | |
|---|---|
| $PbF_2$ | 40–50; |
| $ZnF_2$ | 4–8; and |
| $Bi_2O_3$ | 0–10. |

An optical fiber waveguide article according to an embodiment of the invention comprises an elongated central core member consisting essentially of any of the base glass compositions in Tables I–IV, and a compatible covering or cladding glass according to the compositions listed in Table V.

The central member may also be made up of metal oxides and metal fluorides chosen from the group consisting of (0–7%) $BO_{1.5}$, (0–12%) $GeO_2$, (0–7%) $PO_{2.5}$, (0–3%) $TiO_2$, (0–2%) $Nb_2O_5$, (0–7%) $GaF_3$, (0–7%) $HfF_4$, (0–7%) $InF_3$, (0–15%) $BiF_3$, (0–1%) $LaF_3$, (0–3%) $CdCl_2$, and (0–5%) CdS, which are substituted for the oxides and fluorides in the base glass compositions listed in Tables I–IV. Up to 17 cation % total substitution is acceptable. In general oxides and fluorides are substituted for oxides and fluorides, respectively. The presence of at least four cation % $YF_3$ or at least three cation % $GdF_3$ or $LuF_3$ is required to assure the proper crystallization in situ to yield a transparent glass-ceramic material of high optical clarity. The inclusion of $ZnF_2$ results in somewhat improved glass melting and crystallization behavior; hence, glasses containing $ZnF_2$ are preferred.

The base glass compositions contain a monovalent cation for charge balancing the crystal when a trivalent rare earth ion is incorporated into the divalent cadmium or lead fluoride crystal. $Ag^+$ and $Tl^+$ have been identified as suitable monovalent cations; however, the silver ion is preferred over thallium due to its reduced volatility, smaller ionic size and lower toxicity. In an exemplary embodiment of the invention, the incorporation of between about 500 to 2,000 ppmw and, preferably between about 700–1,000 ppmw, of AgF, $Ag_2O$, $AgNO_3$, or any common silver salt, in the base glass compositions listed in Tables I and II allowed these compositions to accommodate dopant concentrations of $Pr^{3+}$ and $Dy^{3+}$ in the range between about 300 to 2,000 ppmw without the deleterious effects of quenching and cross relaxation formerly observed in the base compositions at dopant concentrations of about 500 ppmw. The reduced clustering of the rare earth ions is borne out by the data shown in FIG. 1, in which the $Ag^+$ containing sample has a significantly lower B/A ratio at the higher $Pr^{3+}$ concentrations than the samples not containing any silver. The "B" value refers to the B transition originating from the $Pr^{3+}$ $^1G_4$ level, peaking at 1300 nm, while the "A" value refers to the A transition originating from the $Pr^{3+}$ $^1D_2$ level, peaking at around 1460 nm. The B/A ratio is an indirect measure of the degree of cross relaxation insofar as when an ion in the $^1D_2$ level exchanges energy with a nearby ion in the ground state, one of the ions is left in the $^1G_4$ level. The nonradiative route to the $^1G_4$ level results in additional B fluorescence, thereby increasing the measured B/A ratio. Cross relaxation becomes more significant at higher $Pr^{3+}$ concentrations, where the ion-ion separation is smaller, for the samples that do not contain a charge balancing monovalent cation as indicated by the higher B/A values for those samples. In FIG. 1, the Y/Z samples refer to the $Pr^{3+}/Dy^{3+}$ doped compositions of Table II (i.e., those containing $ZnF_2$), while the Y samples refer to the (Zn-free) $Pr^{3+}/Dy^{3+}$ doped compositions of Table I. The numbers associated with each composition sample in the form xxx/yy refer to the ceramming temperature and ceramming time respectively for each sample.

Figure 2:
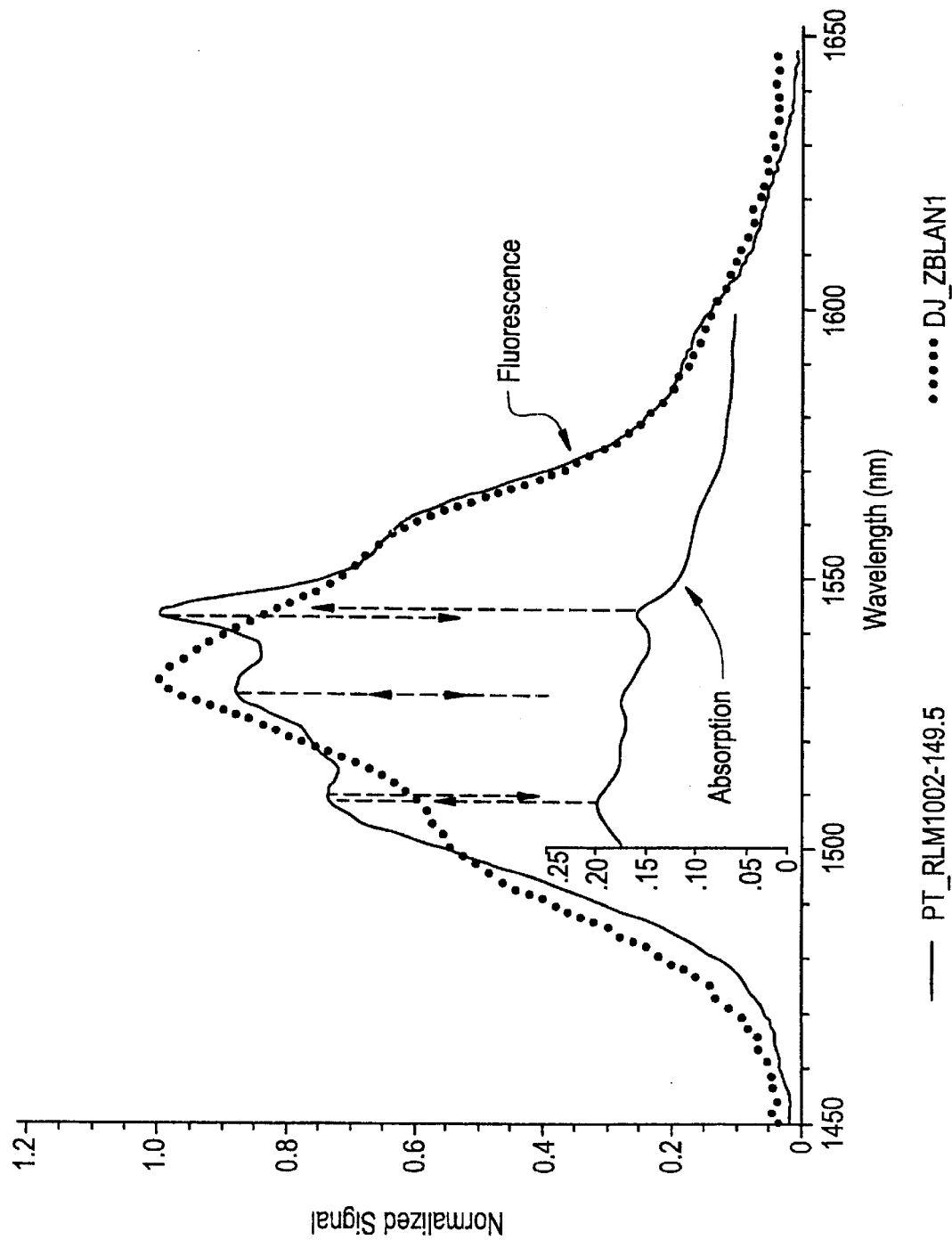
FIG. 2 shows a plot representing the spectral gain band of a ZBLAN glass standard and the correspondingly wider spectral gain band of an article according to an embodiment of the invention.

The inventors have also discovered that the core glass compositions listed in Tables III and IV accommodate from about 500 to 5,000 ppmw $Er^{3+}$ without significant clustering or fluorescence quenching effects in the presence of from 0–2,000 ppmw $Ag^+$. The fluorescence emission curve of FIG. 2 compares the spectral gain band of an $Er^{3+}$ doped compositional embodiment of the invention consisting essentially, in cation %, of 30 $SiO_2$, 15 $AlO_{1.5}$, 3.5 $YF_3$, 5 $ZnF_2$, 17 $PbF_2$, 29 $CdF_2$, and 0.5 $ErF_3$, to an $Er^{3+}$ doped ZBLAN composition and shows that the inventive compositions exhibit longer lifetimes and wider spectral gain bands than $Er^{3+}$ doped aluminosilicate or ZBLAN glass compositions.

Preferred exemplary embodiments for the core glass compositions are presented in Table VI (A, B, C, D, E, F, G and H) below.

TABLE VI (in cation % unless otherwise indicated)

| | A | B | C | D | E | F | G | H |
|---|---|---|---|---|---|---|---|---|
| $SiO_2$ | 30 | 30 | 30 | 30 | 30 | 30 | 30 | 30 |
| $AlO_{1.5}$ | 15 | 15 | 15 | 15 | 15 | 15 | 15 | 15 |
| $CdF_2$ | 29 | 29 | 20 | 30 | 26.5 | 25 | 18 | 28 |
| $CdS/CdCl_2/CdO$ | 0 | 0 | 0 | 0 | 1.5* | 3** | 10*** | 0 |
| $PbF_2$ | 22 | 17 | 25 | 20 | 17 | 17 | 17 | 17 |
| $ZnF_2$ | 0 | 5 | 0 | 0 | 5 | 5 | 5 | 0 |
| ZnO | 0 | 0 | 0 | 0 | 0 | 0 | 0 | 5 |
| $LuF_3$ | 0 | 0 | 10 | 0 | 0 | 0 | 0 | 0 |
| $YF_3$ | 4 | 4 | 0 | 0 | 4 | 4 | 4 | 4 |
| $GdF_3$ | 0 | 0 | 0 | 5 | 0 | 0 | 0 | 0 |
| $Pr^{3+}$ | X' | X' | 0 | 0 | 0 | X" | 0 | 0 |
| $Er^{3+}$ | 0 | 0 | X" | X" | X" | 0 | 0 | 0 |
| $ErF_3$ | 0 | 0 | 0 | 0 | 0 | 0 | 1 | 1 |

$Ag^+$ (ppmw) 500–2,000  500–2,000  0–2,000  0–2,000  <2000  <2000
where * = $CdCl_2$,  = CdS, * = CdO, X' = 300–2,000 (ppmw), and X" = 500–5,000 (ppmw).

Figure 3:
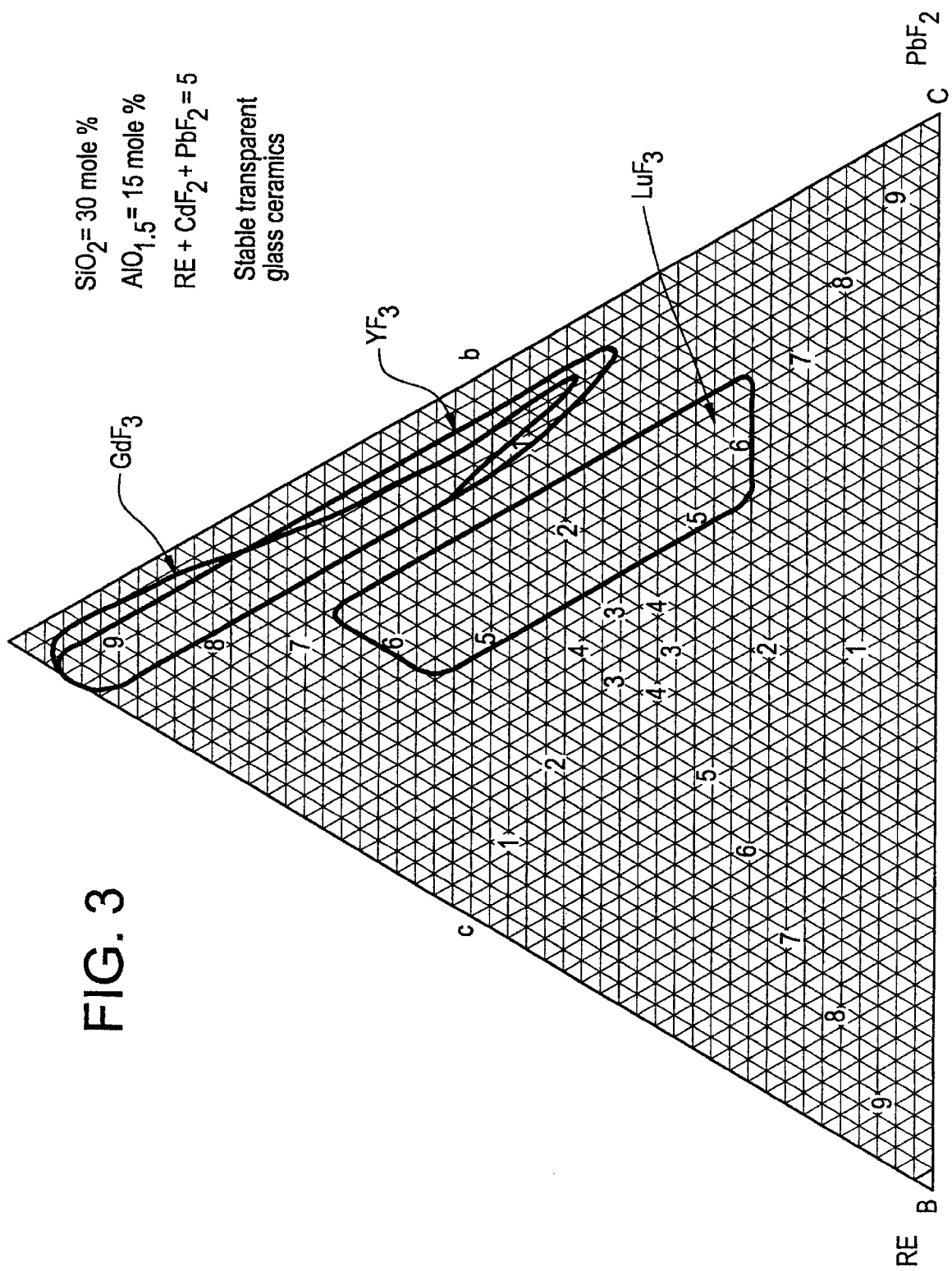
FIG. 3 is a composition map showing the compositional domains of several compositional embodiments of the invention.

The glass map of FIG. 3 shows three preferred composition ranges of core composition embodiments containing $GdF_3$, $YF_3$, and $LuF_3$. The outlined regions delimit the compositions that result in stable, ultratransparent glass-ceramics. Compositions outside of these regions were either unstable or hazy after ceramming.

A preferred exemplary embodiment for the cladding glass composition is presented in Table VII below.

TABLE VII (in weight % on an oxide basis)

| | |
|---|---|
| $SiO_2$ | 32 |
| $Al_2O_3$ | 3.5 |
| $CdF_2$ | 14 |
| $PbF_2$ | 45.6 |
| $ZnF_2$ | 4.9 |
| $Bi_2O_3$ | 0–10 |

Figure 4:
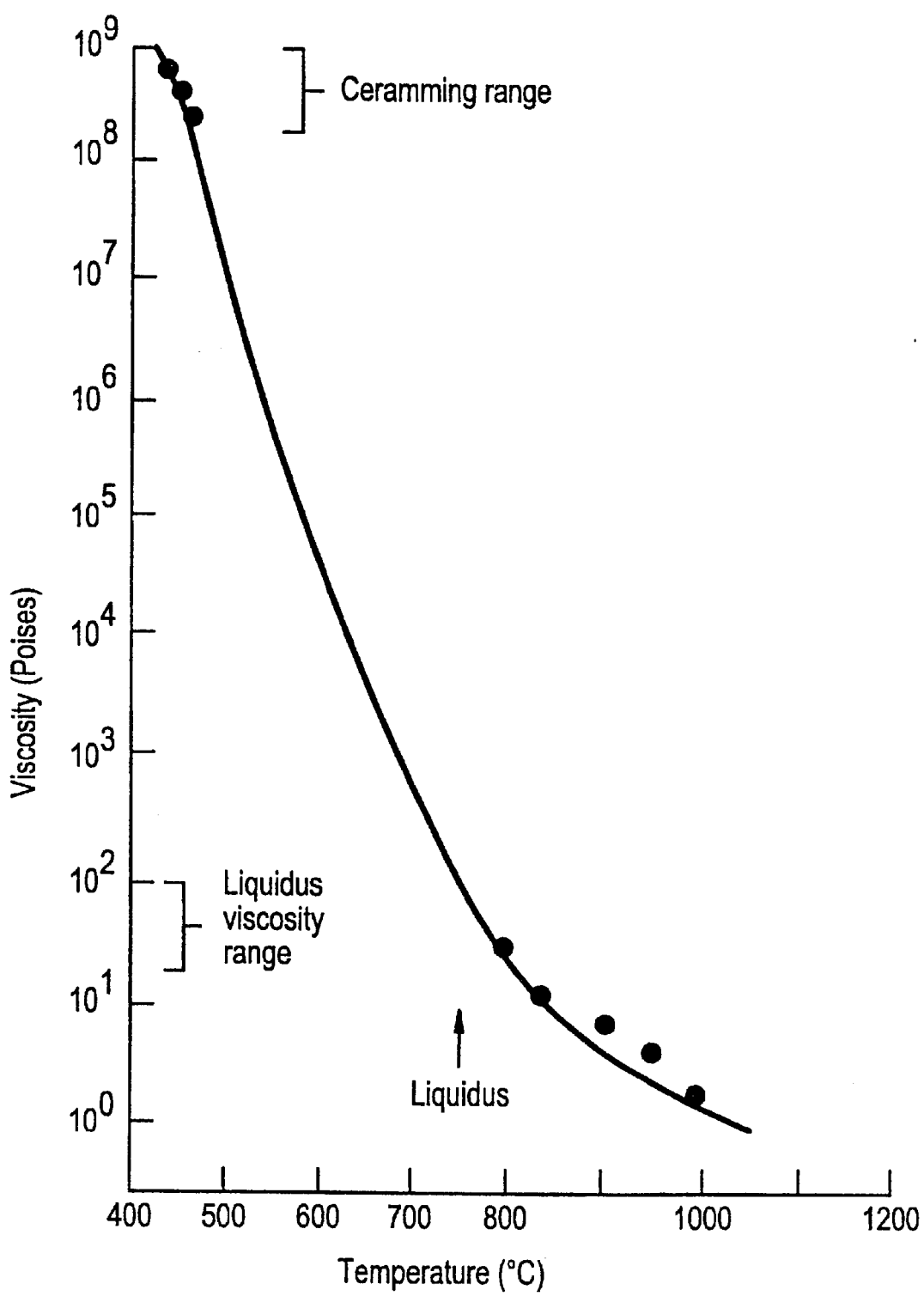
FIG. 4 is a graph of viscosity versus temperature for a fluorinated rare earth core optical glass (FROG) according to an embodiment of the invention indicating the viscosity difference between the glass and glass-ceramic composition.

The double crucible technique is well known in the art and is described in numerous references, such as, "Fabrication of Long Single Mode and Multimode Fluoride Glass Fibers by the Double Crucible Technique", Tokiwa et al., Electronics Letters, #24, V. 21, 1985. It is useful for making optical fiber from a variety of core and cladding compositions, but traditionally requires core and cladding compositions having similar liquidus viscosities. However, the oxyfluoride core composition of the present invention has high temperature properties that tend to be characteristic of fluoride melts, the most difficult of which to deal with is a low liquidus viscosity. Since the ceramming process for an embodiment of the invention occurs at viscosities of at least 100 million poises, as shown in FIG. 4, typical preform/redraw methods for optical fiber production are not viable because the material has a tendency to overceram at normal redraw viscosities. In a normal draw, the stream viscosity must be between about 2,000–1,000,000 poises, preferably between 10,000–1,000,000 poises, in order to control the root. However, the liquidus viscosity of the core compositions of the invention is about four orders of magnitude more fluid than the lower viscosity limit. In light of these considerations, a modified double crucible technique is used to make optical fiber from the compositions listed above wherein a fluid core composition is delivered into a cladding glass that is stiff enough to contain the core stream and eventually be pulled into fiber. An appropriate cladding glass composition as described herein was developed to utilize the double crucible draw method described below.

Figure 5:
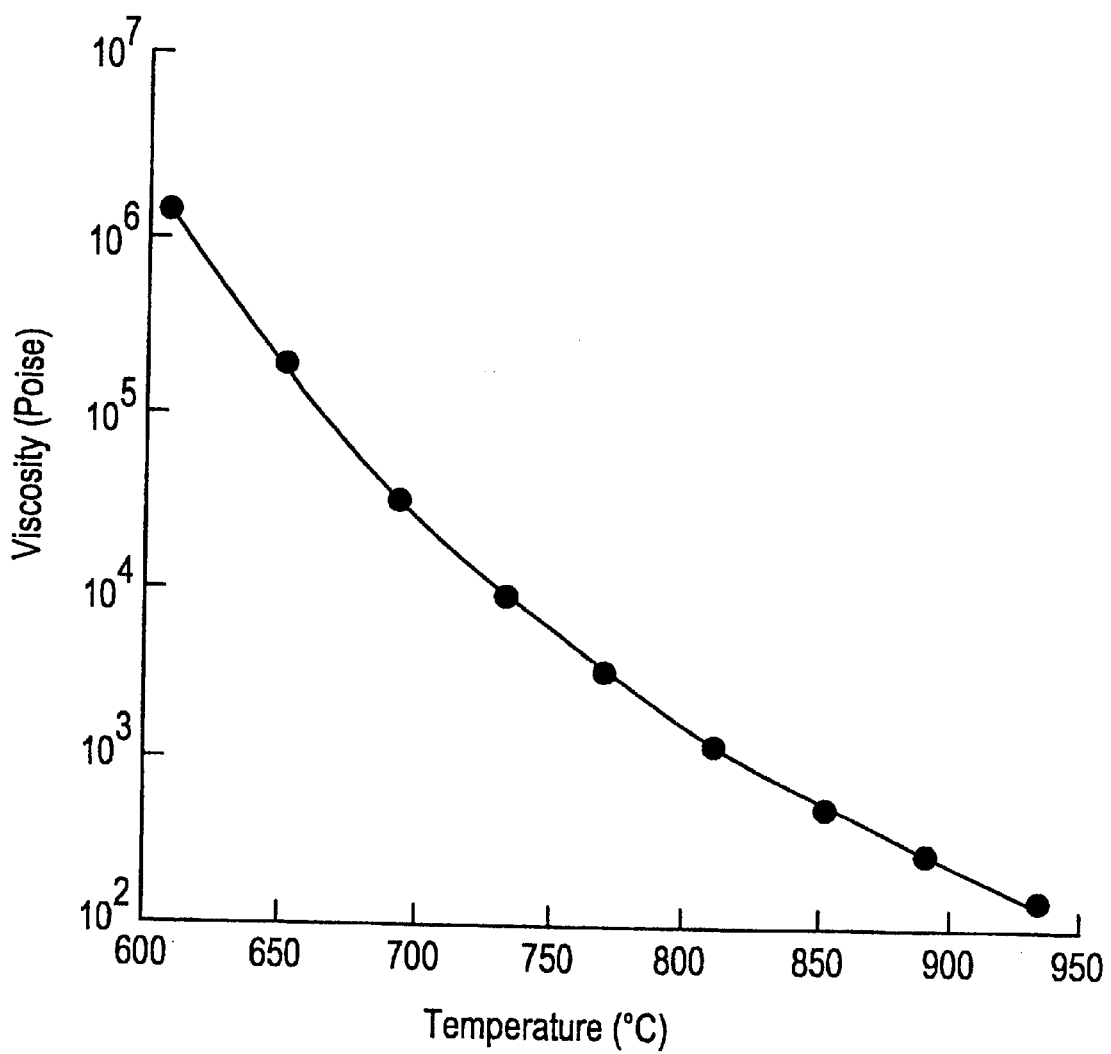
FIG. 5 is a plot of viscosity versus temperature for a cladding glass according to an embodiment of the invention.

The cladding glass will preferably exhibit a refractive index between 1.64 and 1.75, more preferably in the range of 1.65–1.74; a viscosity greater than 1,500 poises at 800° C.; a liquidus temperature less than 800° C.; a coefficient of thermal expansion of between about $65-110\times10^{-7}/°$ C. from room temperature to 300° C.; and be chemically unreactive with the core glass at 800° C. The viscosity behavior of a cladding glass embodiment of the invention is shown in FIG. 5 Although the cladding glass compositions in the '628 and '505 patents involved a family of alkali lead silicate glasses having the physical and optical requirements for a suitable cladding composition, we realized that the presence of alkali in contact with the core composition embodiments at 800° C. resulted in rapid devitrification of the core glass. Moreover, the central member glasses described above will form large, undesirable crystals during the forming step if the glass remains too long at a temperature near the liquidus temperature, i.e., around 800° C. in an embodiment of the invention. Thus it was necessary to modify a standard double crucible furnace in order to make optical fiber. Preferably, as shown schematically in FIG. 6(a–d), a fluorinated rare earth glass (FROG) according to an embodiment of the invention, in a fluid state, and more preferably a fluid core of remelted cullet 78, is delivered into a cladding glass tube 64 having sufficient stiffness to contain the core stream and thereafter be pulled into fiber. A key aspect of the method is preventing the core 78 from ever contacting any platinum wall of the double crucible furnace below its liquidus temperature and, likewise, preventing the cladding glass from contacting the crucible wall below its liquidus temperature so as to prevent undesirable crystal formation. Because the core is always above its liquidus temperature until it leaves the furnace, there is no stagnant subliquidus boundary layer and the residence time in the hot zone is short; hence, the core stream moves through the delivery section 72 of the inner crucible as a slug, preferably as quickly as possible. After it leaves the tip 74 of the delivery section it is rapidly quenched into a glass. Preferably, the glass is quickly cooled to a temperature below the liquidus temperature. This temperature varies depending upon the central member glass composition but is readily determined by differential scanning calorimetry (DSC) or other methods well known in the art. Undesired crystal growth is suppressed by cooling the elongated glass article formed in the double crucible to a temperature below the crystallization temperature range in less than about 1 minute.

In an embodiment of the invention in which up to 5 mole % of CdS or $CdCl_2$ is substituted for an equivalent amount of $CdF_2$, the crystallization (ceramming) of the core occurs spontaneously as the fiber cools upon exiting the draw furnace; therefore, no external heating is required to ceram the glass.

In general the peak crystallization temperature for ceramming, as shown in FIG. 4, lies in the range of about 400 to 500° C. Once the glass article has reached its final shape, it can be reheated (for those compositions requiring additional heating; i.e., an external ceramming step), to ceram the core into an ultratransparent glass-ceramic. The crystallization process may be carried out at or near the peak crystallization temperature (the term crystallization as used herein is equivalent to transforming a glass into a glass-ceramic). This temperature is desirable because of the control one has in determining the size, the number and the spacing of the crystals. The preferred temperature is in the range of about 400 to 500° C. and the time in this temperature range may vary from ½ to 24 hours. One may choose a temperature whereat the required crystallization is complete in 2–8 hours. The viscosity curve of FIG. 4 is generally representative of a FROG according to a compositional embodiment of the invention. The curve between the two sets of data was arbitrarily interpolated. The liquidus temperature is about 800° C. corresponding to a viscosity of about 25 poises, while the ceramming viscosity is shown to lie above $10^8$ poises.

FIGS. 6(a–d) schematically illustrate the details of the modified double crucible design and method. An outer crucible 60 is shown in FIG. 6(b). The outer crucible has a tubular delivery section 62 that is about two inches (5.08 cm.) long and has an inner diameter of about 0.400 in. (1.02 cm). A platinum rod having a tapered end (not shown) is mountable for insertion into the lower end of the delivery tube 62 to prevent clad glass 64 from prematurely leaking out of the outer crucible. The inner crucible 70 has a delivery section 72 having a tubular tip 74 at the lower end thereof that is about one inch (2.54 cm) in length and preferably has an inner diameter of 0.030 in. (0.076 cm)±0.005 in (0.013 cm) for the compositional embodiments of the invention. The inner crucible is mounted on an independently movable triaxial support bracket 76 to allow the tip 74 of the inside tube to be positioned at any desired position within the delivery section 62 of the outer crucible during a run.

A platinum wire (not shown) having an outer diameter sufficient to easily but snugly fit through and removably position the wire in the delivery section 72 via the tip opening 74 was used to seal the inner crucible to prevent flow of the fluid core 78 through the tip of the inner crucible until the system was ready to operate. A Teflon plug 82 was optionally used to seal the inner crucible at an upper region thereof to pressurize the tube if desired. The inner diameter of the tip 74 of the inner crucible 70 is critical in order to control the flow of core glass. A too small tip I.D. can cause the fluid core to have too much surface tension to flow, while a too large I.D. can cause the core/cladding stream to be uncontrollable. As will be appreciated by a skilled practitioner, tip dimensions and flow rates will depend at least in part upon fluid core viscosities; therefore the modified double crucible dimensions and process must be adjusted accordingly.

In an exemplary embodiment, the furnace 90, as shown schematically in FIG. 6(d), is split into two zones 92 and 94, separated by an insulating plate 96. A charge of glass cullet is introduced into inner crucible in the upper zone 92 and remelted, the temperature of the upper zone being maintained at between about 1000–1200° C. by thermocouple 98. There was about a 70° C. gradient from the control couple 98 to the center of the inner crucible, therefore since the FROG cullet must be remelted above 1050° C., the upper zone was maintained at 1150° C. for each run. A lower set point temperature control couple 100 was positioned in contact with and about one inch from the end of the delivery tube 72 and was set at least 800° C. The tip 74 of the inside delivery tube 72 was positioned at the same height as the thermocouple 100. A fiberfrax sheet 102 was placed between the delivery pipe and the lower muffle 94 to prevent cooling of the delivery section 72. An external air cooling ring 104 having 20 circularly arranged, downward angled holes 106, was positioned just below the tip of the delivery tube. Gas flow from the cooling ring effectively controlled the size of the root by cooling the glass as it exited the delivery pipe, thus minimizing the possibility of devitrification. The described parameters provided a process window over which core/clad structured optical waveguide fiber was fabricated.

It will be apparent to those skilled in the art that various modifications and variations can be made in the apparatus and method of the present invention without departing from the spirit or scope of the invention. Thus, it is intended that the present invention cover the modifications and variations of this invention provided they come within the scope of the appended claims and their equivalents.

What is claimed is:

1. A method of making an optical fiber waveguide comprising the steps of:
   a) forming an elongated glass body having a first end and a second end, the elongated glass body comprising
      a central member consisting of a first transparent glass consisting essentially of
         20–40 cation percent $SiO_2$,
         10–20 cation percent $AlO_5$,
         0–5 cation percent CdS,
         0–3 cation percent $CdCl_2$,
         0–34 cation percent CdO,
         0–34 cation percent $CdF_2$, wherein the total amount of $CdF_2$, CdS, $CdCl_2$ and CdO is between 19 cation percent and 34 cation percent,
         19–23 cation percent $PbF_2$,
         at least one rare earth fluoride selected from the group consisting of 3–7 cation percent $YF_3$, cation percent $GdF_3$, and 4–15 cation percent $LuF_3$, wherein the total amount of $YF_3$, $GdF_3$ and $LuF_3$ is between 3 cation percent and 15 cation percent,
         at least one rare earth ion selected from the group consisting of $Pr^{3+}$ and $Dy^{3+}$, wherein the total amount of $Pr^{3+}$ and $Dy^{3+}$ is between about 300 ppmw and about 2000 ppmw,
         0–17 cation percent total of one or more compounds selected from the group consisting of 0–7 cation percent $BO_{1.5}$, 0–12 cation percent $GeO_2$, 0–7 cation percent $PO_{2.5}$, 0–3 cation percent $TiO_2$, 0–2 cation percent $Nb_2O_5$, 0–7 cation percent $GaF_3$, 0–7 cation percent $HfF_4$, 0–7 cation percent $InF_3$, 0–15 cation percent $BiF_3$, and 0–1 cation percent $LaF_3$, and
         about 500 ppmw to about 2000 ppmw $Ag^+$; and
      a second transparent glass covering the surface of the central member, the second transparent glass consisting essentially of
         $SiO_2$ in an amount of 25–35 wt % on an oxide basis,
         $Al_2O_3$ in an amount of 3–5 wt % on an oxide basis,
         $CdF_2$ in an amount of 12–16 wt % on an oxide basis,
         $PbF_2$ in an amount of 40–50 wt % on an oxide basis,
         $ZnF_2$ in an amount of 4–8 wt % on an oxide basis, and
         $Bi_2O_3$ in an amount of 0–10 wt % on an oxide basis; and
   b) heating the elongated glass body at a pre-selected temperature for a pre-selected time, thereby transforming the central member into a transparent, optically clear glass-ceramic containing essentially only one crystal phase.

2. The method of claim 1 wherein the forming step is carried out using a double crucible technique, wherein the first transparent glass has a peak crystallization temperature, and further wherein the first transparent glass and the second transparent glass are each heated to a temperature in the range of about 1,000–1,200° C. during forming, and the formed first transparent glass is quenched to a temperature below its peak crystallization temperature in a time of less than 1 minute.

3. The method of claim 1 wherein the heating step is carried out using a pre-selected temperature near the peak crystallization temperature of the first transparent glass and the pre-selected time is in the range of about ½–24 hours.

4. The method of claim 1 wherein the amount of $Ag^+$ in the first transparent glass is between about 700 ppmw and about 1000 ppmw.

5. A method of making an optical fiber waveguide comprising the steps of:
   a) forming an elongated glass body having a first end and a second end, the elongated glass body comprising
      a central member consisting of a first transparent glass consisting essentially of
         20–40 cation percent $SiO_2$,
         10–20 cation percent $AlO_{1.5}$,
         0–5 cation percent CdS,
         0–3 cation percent $CdCl_2$,
         0–34 cation percent CdO,
         0–34 cation percent $CdF_2$, wherein the total amount of $CdF_2$, CdS, $CdCl_2$ and CdO is between 19 cation percent and 34 cation percent,
         15–25 cation percent $PbF_2$,
         0–7 cation percent $ZnF_2$,
         at least one rare earth fluoride selected from the group consisting of 3–7 cation percent $YF_3$, 3–7 cation percent $GdF_3$, and 4–15 cation percent $LuF_3$, wherein the total amount of $YF_3$, $GdF_3$ and $LuF_3$ is between 3 cation percent and 15 cation percent,
         at least one rare earth ion selected from the group consisting of $Pr^{3+}$ and $Dy_{3+}$, wherein the total amount of $Pr^{3+}$ and $Dy_{3+}$ is between about 300 ppmw and about 2000 ppmw,
         0–17 cation percent total of one or more compounds selected from the group consisting of 0–7 cation percent $BO_{1.5}$, 0–12 cation percent $GeO_2$, 0–7 cation percent $PO_{2.5}$, 0–3 cation percent $TiO_2$, 0–2 cation percent $Nb_2O_5$, 0–7 cation percent $GaF_3$, 0–7 cation percent $HfF_4$, 0–7 cation percent $InF_3$, 0–15 cation percent $BiF_3$, and 0–1 cation percent $LaF_3$, and
         about 500 ppmw to about 2000 ppmw $Ag^+$; and
   b) transforming the central member into a transparent, optically clear glass-ceramic containing essentially only one crystal phase.

6. The method of claim 5 wherein the step of transforming the central member into a transparent, optically clear glass-ceramic includes heating the elongated glass body at a pre-selected temperature for a pre-selected time.

7. The method of claim 5 wherein the step of transforming the central member into a transparent, optically clear glass-ceramic includes allowing the elongated glass body to cool from the forming step.

8. The method of claim 5 wherein the amount of $PbF_2$ in the first transparent glass is in the range of 19–23 cation percent, wherein the amount of $ZnF_2$ in the first transparent glass is essentially zero.

9. The method of claim 5 wherein the amount of $CdF_2$ in the first transparent glass is in the range of 21–31 cation percent, and wherein the amount of $ZnF_2$ in the first transparent glass is in the range of 3–7 cation percent.

10. The method of claim 5 wherein the amount of $Ag^+$ in the first transparent glass is in the range of 700–1000 ppmw.

11. The method of claim 5 wherein the elongated glass body further comprises a second transparent glass covering the surface of the central member, the second transparent glass consisting essentially of $SiO_2$ in an amount of 25–35 wt % on an oxide basis,
$Al_2O_3$ in an amount of 3–5 wt % on an oxide basis,
$CdF_2$ in an amount of 12–16 wt % on an oxide basis,
$PbF_2$ in an amount of 40–50 wt % on an oxide basis,
$ZnF_2$ in an amount of 4–8 wt % on an oxide basis, and
$Bi_2O_3$ in an amount of 0–10 wt % on an oxide basis.

12. A method of making an optical fiber waveguide comprising the steps of:

a) forming an elongated glass body having a first end and a second end, the elongated glass body comprising
a central member consisting of a first transparent glass consisting essentially of
20–40 cation percent $SiO_2$,
10–20 cation percent $AlO_{1.5}$,
0–5 cation percent CdS,
0–3 cation percent $CdCl_2$,
0–34 cation percent CdO,
0–34 cation percent $CdF_2$, wherein the total amount of $CdF_2$, CdS, $CdCl_2$ and CdO is between 19 cation percent and 34 cation percent,
15–25 cation percent $PbF_2$,
0–7 cation percent $ZnF_2$,
at least one rare earth fluoride selected from the group consisting of 3–7 cation percent $YF_3$, 3–7 cation percent $GdF_3$, and 4–15 cation percent $LuF_3$, wherein the total amount of $YF_3$, $GdF_3$ and $LuF_3$ is between 3 cation percent and 15 cation percent,
$Er^{3+}$ in an amount between about 300 ppmw and about 2000 ppmw,
0–17 cation percent total of one or more compounds selected from the group consisting of 0–7 cation percent $BO_{1.5}$, 0–12 cation percent $GeO_2$, 0–7 cation percent $PO_{2.5}$, 0–3 cation percent $TiO_2$, 0–2 cation percent $Nb_2O_5$, 0–7 cation percent $GaF_3$, 0–7 cation percent $HfF_4$, 0–7 cation percent $InF_3$, 0–15 cation percent $BiF_3$, and 0–1 cation percent LaF and
about 0 ppmw to about 2000 ppmw $Ag^+$, and
a second transparent glass covering the surface of the central member, the second transparent glass consisting essentially of
$SiO_2$ in an amount of 25–35 wt % on an oxide basis,
$Al_2O_3$ in an amount of 3–5 wt % on an oxide basis,
$CdF_2$ in an amount of 12–16 wt % on an oxide basis,
$PbF_2$ in an amount of 40–50 wt % on an oxide basis,
$ZnF_2$ in an amount of 4–8 wt % on an oxide basis, and
$Bi_2O_3$ in an amount of 0–10 wt % on an oxide basis;
and b) transforming the central member into a transparent, optically clear glass-ceramic containing essentially only one crystal phase.

13. The method of claim 12 wherein the step of transforming the central member into a transparent, optically clear glass-ceramic includes heating the elongated glass body at a pre-selected temperature for a pre-selected time.

14. The method of claim 12 wherein the step of transforming the central member into a transparent, optically clear glass-ceramic includes allowing the elongated glass body to cool from the forming step.

15. The method of claim 12 wherein the amount of $PbF_2$ in the first transparent glass is in the range of 19–23 cation percent, wherein the amount of $ZnF_2$ in the first transparent glass is essentially zero.

16. The method of claim 12 wherein the amount of $CdF_2$ in the first transparent glass is in the range of 21–31 cation percent, and wherein the amount of $ZnF_2$ in the first transparent glass is in the range of 3–7 cation percent.

* * * * *